United States Patent
Tanaka (10) Patent No.: US 7,945,120 B2
(45) Date of Patent: May 17, 2011

(54) APPARATUS FOR ENHANCING RESOLUTION USING EDGE DETECTION

(75) Inventor: Akira Tanaka, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/464,671

(22) Filed: May 12, 2009

(65) Prior Publication Data

US 2009/0324090 A1    Dec. 31, 2009

(30) Foreign Application Priority Data

Jun. 30, 2008    (JP) ................. 2008-170167

(51) Int. Cl.
  *G06K 9/48* (2006.01)
  *G06K 9/40* (2006.01)
  *G06K 9/32* (2006.01)
(52) U.S. Cl. ......... 382/299; 382/199; 382/266; 382/255
(58) Field of Classification Search .......... 382/199, 382/266, 255, 299
  See application file for complete search history.

(56) References Cited

U.S. PATENT DOCUMENTS

| | | | | |
|---|---|---|---|---|
| 6,038,348 | A | * | 3/2000 | Carley ............ 382/268 |
| 6,600,517 | B1 | * | 7/2003 | He et al. ......... 348/625 |
| 2005/0018077 | A1 | * | 1/2005 | De Haan et al. ..... 348/458 |
| 2005/0232492 | A1 | | 10/2005 | Aoyama |
| 2007/0269137 | A1 | | 11/2007 | Ida et al. |

FOREIGN PATENT DOCUMENTS

| JP | 2000-188680 | 7/2000 |
|---|---|---|
| JP | 2000-188680 A | 7/2000 |
| JP | 3301995 | 4/2002 |
| JP | 2003-283821 | 10/2003 |
| JP | 2003-283821 A | 10/2003 |
| JP | 2006-050481 | 2/2006 |
| JP | 2006-094419 | 4/2006 |
| JP | 2006-221221 | 8/2006 |
| JP | 2007-310837 | 11/2007 |
| JP | 4116649 | 4/2008 |
| JP | 2009-070123 | 4/2009 |
| JP | 4384242 | 10/2009 |

OTHER PUBLICATIONS

Explanation of Non-English Language Reference(s).
Notice of Reasons For Rejection For Japanese Patent Application No. 2008-304690 mailed by the Japan Patent Office on Feb. 9, 2010 along with an English translation thereof and Statement of Accuracy of Translation in five (5) pages.

* cited by examiner

*Primary Examiner* — Kathleen S Yuan
(74) *Attorney, Agent, or Firm* — Knobbe, Martens, Olson & Bear LLP (57) ABSTRACT

According to one embodiment, an edge detection module detects edges in a frame of a moving picture signal in accordance with an edge determination reference value. A resolution conversion module converts a resolution of the frame from a first resolution to a second resolution, thereby generating a provisional high-resolution image. A corresponding pixel point detection module detects corresponding pixels in the provisional high-resolution image, which correspond to each of the detected edges. An image quality enhancement process module executes an image quality enhancement process for sharpening for each of the detected corresponding pixels in the provisional high-resolution image. A control module varies the edge determination reference value based on the detected edge number and a maximum edge number at which an information processing apparatus is able to complete the resolution-enhancing process for one frame within a target process time.

10 Claims, 6 Drawing Sheets

APPARATUS FOR ENHANCING RESOLUTION USING EDGE DETECTION

CROSS-REFERENCE TO RELATED APPLICATIONS

This application is based upon and claims the benefit of priority from Japanese Patent Application No. 2008-170167, filed Jun. 30, 2008, the entire contents of which are incorporated herein by reference.

BACKGROUND

1. Field

One embodiment of the invention relates an information processing apparatus, such as a personal computer, a digital TV or a set-top box, and an image processing method.

2. Description of the Related Art

In recent years, personal computers of various types, such as a notebook type and a desktop type, have widely been used. The personal computers of these types include those which play back moving picture data by software. In addition, recently, there has been the advent of software having a resolution-enhancing function (up-convert function) for generating image data having a higher resolution than input image data.

As a method for resolution enhancement, there is known a frames degradation inverse transform method which is disclosed, for instance, in Jpn. Pat. Appln. KOKAI Publication No. 2000-188680. In this frames degradation inverse transform method, attention is paid to the fact that a subject, which appears in a reference frame, also appears in another frame. The movement of the subject is detected with a high precision that is less than a pixel interval. Thereby, a plurality of sample values with slightly different positions can be obtained with respect to the same local part of the subject.

In the frames degradation inverse transform method, however, many low-resolution images are necessary in order to obtain a sufficient number of sample values, and this requires a large memory capacity and a large arithmetic process amount. In addition, usually, the arithmetic process amount, which is needed for the resolution-enhancing process, varies depending on the image quality of a moving picture signal that is to be processed.

In order to display a moving picture signal with a standard resolution on a high-resolution display in real time, without causing problems such as frame dropping or display delay, it is necessary to make the time, which is needed for a resolution-enhancing process per frame, fall within a predetermined target time.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus which is configured to execute a resolution-enhancing process for generating, from a moving picture signal with a first resolution, a moving picture signal with a second resolution which is higher than the first resolution, comprising: an edge detection module configured to detect edges in a to-be-processed frame of the moving picture signal with the first resolution in accordance with a predetermined edge determination reference value; an edge number counting module configured to count a number of edges which are detected; a resolution conversion module configured to convert a resolution of the to-be-processed frame from the first resolution to the second resolution, thereby generating a provisional high-resolution image having the second resolution; a corresponding pixel point detection module configured to detect corresponding pixels in the provisional high-resolution image, which correspond to each of the detected edges; an image quality enhancement process module configured to execute an image quality enhancement process for sharpening for each of the detected corresponding pixels in the provisional high-resolution image; and a control module configured to calculate a maximum edge number at which the information processing apparatus is able to complete the resolution-enhancing process for one frame within a target process time, and to vary the edge determination reference value based on the detected edge number and the maximum edge number, thereby to suppress the detected edge number to the maximum edge number or less.

Figure 1:
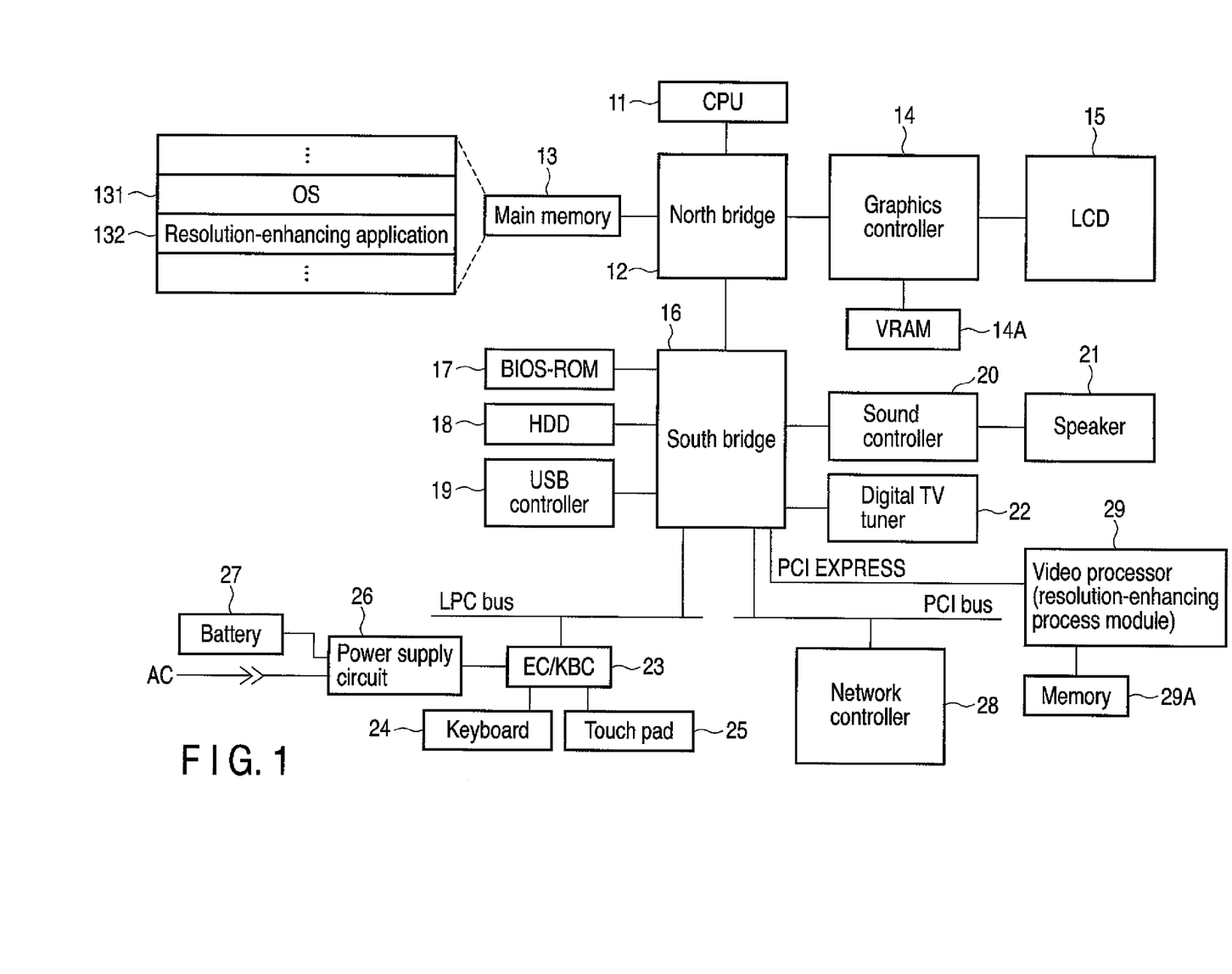
FIG. 1 is an exemplary block diagram showing a structure example of an information processing apparatus according to an embodiment of the invention.

FIG. 1 shows the structure of an information processing apparatus according to an embodiment of the present invention. This information processing apparatus is realized, for example, as a battery-powerable notebook personal computer.

As shown in FIG. 1, this computer comprises a CPU 11, a north bridge 12, a main memory 13, a graphics controller 14, a video memory (VRAM) 14A, a liquid crystal display (LCD) 15, a south bridge 16, a BIOS-ROM 17, a hard disk drive (HDD) 18, a USB controller 19, a sound controller 20, a speaker 21, a digital TV tuner 22, an embedded controller/keyboard controller IC (EC/KBC) 23, a keyboard 24, a touch pad 25, a power supply circuit 26, a battery 27, a network controller 28, and a video processor 29.

The CPU 11 is a processor which controls the operations of the respective components in the computer. The CPU 11 executes an operating system (OS) 131 which is loaded from the HDD 18 into the main memory 13, and various application programs. The application programs include a resolution-enhancing application program 132. The CPU 11 also executes a BIOS which is stored in the BIOS-ROM 17. The BIOS is a program for various hardware control.

The north bridge 12 is a bridge device which connects a local bus of the CPU 11 and the south bridge 16. The north bridge 12 has a function of executing communication with the graphics controller 14 via a bus. The north bridge 12 includes a memory controller which access-controls the main memory 13. The graphics controller 14 is a display controller for controlling the LCD 15 which is used as a display monitor of the computer. The number of pixels of the LCD 15 is, for example, 1920×1080. The graphics controller 14 generates a display signal, which is to be sent to the LCD 15, on the basis of image data that is written in the VRAM 14A.

The south bridge 16 is a controller which controls various devices on a PCI bus and an LPC bus. The BIOS-ROM 17, HDD 18, USB controller 19, sound controller 20 and digital TV tuner 22 are connected to the south bridge 16. The HDD 18 is a storage device which stores various software and data. The USB controller 19 is a controller which controls various USB devices which are connected to the computer over cables. The sound controller 20 is a sound source device, which outputs an audio signal to the speaker 21. The digital TV tuner 22 is a reception device for receiving digital TV broadcast program data which is broadcast by a broadcast signal.

The south bridge 16 has a function of controlling various devices on the LPC (Low Pin Count) bus and various devices on the PCI (Peripheral Component Interconnect) bus. Further, the video processor 29 is connected to the south bridge 16 via, e.g. a PCI EXPRESS serial bus.

The video processor 29 is a processor which executes a resolution-enhancing process (also referred to as "super resolution processing") under the control of the resolution-enhancing application program 132. The resolution-enhancing process is an up-convert process for enhancing the resolution of a moving picture signal. This resolution-enhancing process is used, for example, in order to generate a moving picture signal having an HD (high definition)-standard resolution (1440 pixels in the horizontal direction; 960 pixels in the vertical direction) from a moving picture signal having an SD (standard definition)-standard resolution (720 pixels in the horizontal direction; 480 pixels in the vertical direction). A memory 29A is used as a working memory of the video processor 29.

In order to execute the resolution-enhancing process, a large arithmetic amount is needed. In the present embodiment, the video processor 29, which is a purpose-specific processor that is different from the CPU 11, is used as a back-end processor. The resolution-enhancing process is executed by the video processor 29. Therefore, the resolution-enhancing process can be executed without causing an increase in load on the CPU 11. In place of the video processor 29, the CPU 11 can execute the resolution-enhancing process.

The EC/KBC 23 is a 1-chip microcomputer in which an embedded controller for power management and a keyboard controller for controlling the keyboard 24 and touch pad 25 are integrated. The EC/KBC 23 cooperates with the power supply circuit 26 to supply power from the battery 27 or an external AC power supply to the respective components. The network controller 28 is a communication device which executes communication with an external network such as the Internet.

The resolution-enhancing application program 132 uses the video processor 29, thereby executing the resolution-enhancing process for converting the resolution of a moving picture signal, which is to be displayed, from an SD resolution to an HD resolution. Thus, the resolution-enhancing application program 132 and the video processor 29 can function as a resolution-enhancing device for executing the resolution-enhancing process.

Figure 2:
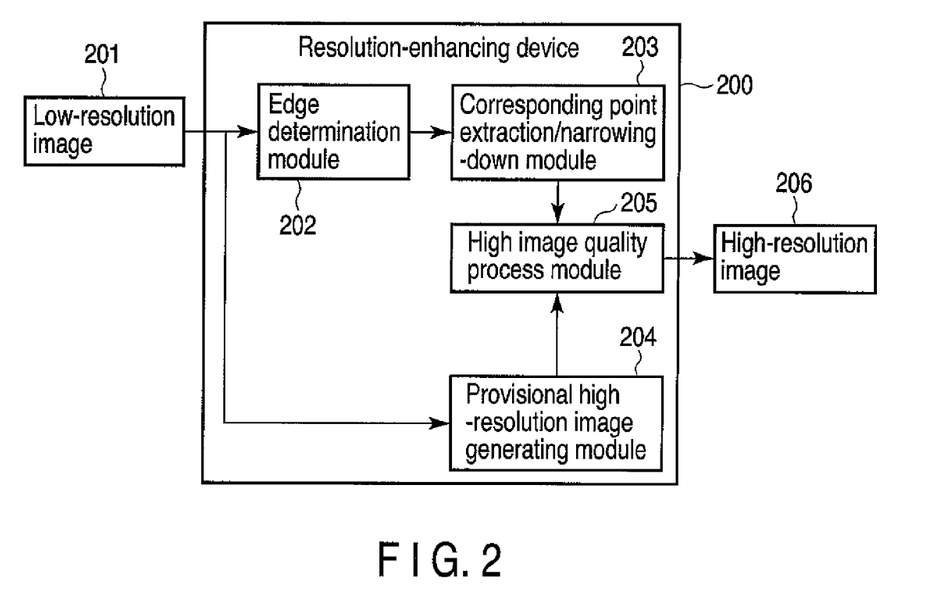
FIG. 2 is an exemplary block diagram showing a structure example of a resolution-enhancing device which is applied to the information processing apparatus according to the embodiment.

FIG. 2 shows the basic structure of a resolution-enhancing device 200.

The resolution-enhancing device 200 enlarges a low-resolution image 201 and subjects the enlarged image to a high image quality process such as a sharpening process, thereby generating a high-resolution image 206. The low-resolution image 201 is, for example, an SD-resolution moving picture signal such as TV broadcast program data or Internet-delivered video data. The high-resolution image 206 is, for example, a moving picture signal having the HD resolution. The resolution-enhancing device 200 includes an edge determination module 202, a corresponding point extraction/narrowing-down module 203, a provisional high-resolution image generating module 204 and a high image quality process module 205.

The edge determination module 202 detects edges included in a frame of a moving picture signal, which is input as the low-resolution image 201, on a frame-by-frame basis. The edge detection is executed according to a predetermined edge determination reference value. The edge determination module 202 determines whether an edge is present in each of pixels in the frame, according to the edge determination reference value. The edge is a part at which a pixel value (luminance value) in the image sharply varies. A Sobel filter, for instance, is usable for the edge detection. Specifically, the edge determination module 202 calculates a pixel value gradient corresponding to each of the pixels. The pixel value gradient is indicative of a difference between the pixel value of an object pixel and the pixel value of another pixel which neighbors in a vertical direction or a horizontal direction. If the pixel value gradient of a certain object pixel is equal to or higher than the edge determination reference value, the edge determination module 202 determines that an edge is present in this object pixel. On the other hand, if the pixel value gradient of a certain object pixel is lower than the edge determination reference value, the edge determination module 202 determines that this object pixel has no edge.

The edge detection result can be represented by, for example, binary image data having the same number of pixels as the low-resolution image 201. In this case, a pixel "1" in the binary image data indicates that an edge is present in the pixel in the low-resolution image 201, which corresponds to this pixel "1". A pixel "0" in the binary image data indicates that an edge is not present in the pixel in the low-resolution image 201, which corresponds to this pixel "0".

The corresponding point extraction/narrowing-down module 203 executes a process of extracting a plurality of corresponding pixels (also referred to as "corresponding points") in a provisional high-resolution image (to be described later), which are to be subjected to a high image quality process (an image quality enhancement process), with respect to each of detected edges. Specifically, the corresponding point extraction/narrowing-down module 203 detects, with respect to each of detected edges, a plurality of corresponding pixels (corresponding points) in the provisional high-resolution image, which correspond to the edge. As a method for detecting the corresponding points, use may be made of a method disclosed, for instance, in U.S. Patent Application Publication No. 2007/0269137A1.

In this case, the corresponding point extraction/narrowing-down module 203 uses a pixel including an edge as a point of interest, and determines a plurality of corresponding pixels in the provisional high-resolution image, which correspond to this point of interest. These corresponding points are subjected to the high image quality process (image quality enhancement process). The corresponding point extraction/narrowing-down module 203, for example, calculates a variation of a luminance pattern of a block including the point of interest in the low-resolution image 201, and searches the provisional high-resolution image for a plurality of blocks having a variation of the luminance pattern, which is similar to the calculated variation of the luminance pattern. In this case, the center position of each of the plural blocks obtained by the search can be determined as the corresponding point.

The corresponding point extraction/narrowing-down module 203 also executes a process of narrowing down the corresponding pixels, which are to be actually subjected to the high image quality process, from among the corresponding pixels in the provisional high-resolution image, which correspond to the respective edges. In this narrowing-down process, the corresponding point extraction/narrowing-down module 203 calculate the difference between the pixel value (luminance value) of the pixel including the edge in the low-resolution image 201 and the pixel value (luminance value) of each corresponding pixel in the provisional high-resolution image, which corresponds to this edge, and determines whether the application of the high image quality process is effective or not, with respect to each of the corresponding pixels. The corresponding pixel in the provisional high-resolution image, which has a small difference from the pixel including the edge, is determined to be the pixel for which the application of the high image quality process is effective.

The provisional high-resolution image generating module 204 generates a provisional high-resolution image which is an enlarged image before being subjected to the high image quality process. Specifically, the provisional high-resolution image generating module 204 converts, with respect to each of the frames of the moving picture signal that is input as the low-resolution image 201, the resolution of the frame from the SD resolution to the HD resolution, thereby generating a provisional high-resolution image having the HD resolution. As a method for the resolution enhancement, that is, as a method for image enlargement, use can be made of, for instance, cubic convolution or bilinear interpolation.

The high image quality process module 205 subjects each of the corresponding pixels in the provisional high-resolution image to an image quality enhancement process for sharpening (high image quality process). The image quality enhancement process is a process for converting the provisional high-resolution image to an image with higher sharpness. An image, which is obtained by the image quality enhancement process by the high image quality process module 205, is the high-resolution image 206. The high-resolution image 206 is generated from each frame of the moving picture signal that is input as the low-resolution image 201, and the high-resolution image 206 is displayed on the display such as the LCD 15.

The number of pixels, which are to be subjected to the image quality enhancement process by the high image quality process module 205, varies in accordance with the number of corresponding pixels, which are determined by the corresponding point extraction/narrowing-down module 203. Similarly, the number of pixels, which are to be subjected to the image quality enhancement process, is also influenced by the number of edges which are detected by the edge determination module 202.

Figure 4:
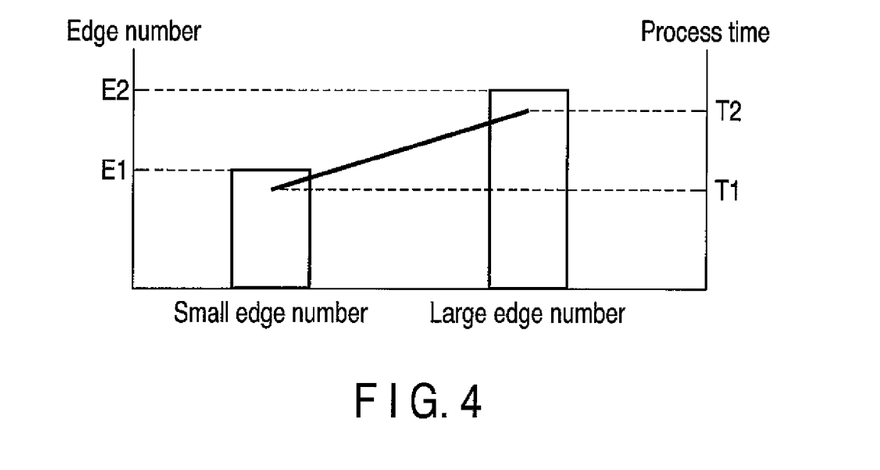
FIG. 4 is an exemplary graph showing the relationship between the number of edges of a moving picture signal and a process time that is needed for a resolution-enhancing process in the information processing apparatus according to the embodiment.

The amount of arithmetic operation for the image quality enhancement process for one pixel in the provisional high-resolution image is constant. However, the process time that is needed for the image quality enhancement process per frame increases in accordance with an increase in the number of edges detected by the edge determination module 202 or an increase in the number of corresponding pixels determined by the corresponding point extraction/narrowing-down module 203. Specifically, as shown in FIG. 4, in the case where the low-resolution image 201 is an image with a small number of edges (edge number=E1), the process time that is needed for the resolution-enhancing process per frame is T1. On the other hand, in the case where the low-resolution image 201 is an image with a large number of edges (edge number=E2), the process time that is needed for the resolution-enhancing process per frame increases to T2 (T2>T1).

In the case where the moving picture signal, which is obtained by the resolution-enhancing device 200, is displayed on the display device, it is necessary to generate the high-resolution image 206 of one frame within a predetermined time. For example, in the case of playing back a moving picture signal with 30 frames/second, the time that is usable for generating the high-resolution image 206 of one frame is about 33 msec. It is thinkable that if a moving picture signal with a large number of edges is input to the resolution-enhancing device 200, the time that is needed for generating the high-resolution image 206 of one frame may exceed 33 msec. In this case, in the display device, problems such as frame dropping or display delay will occur.

Figure 3:
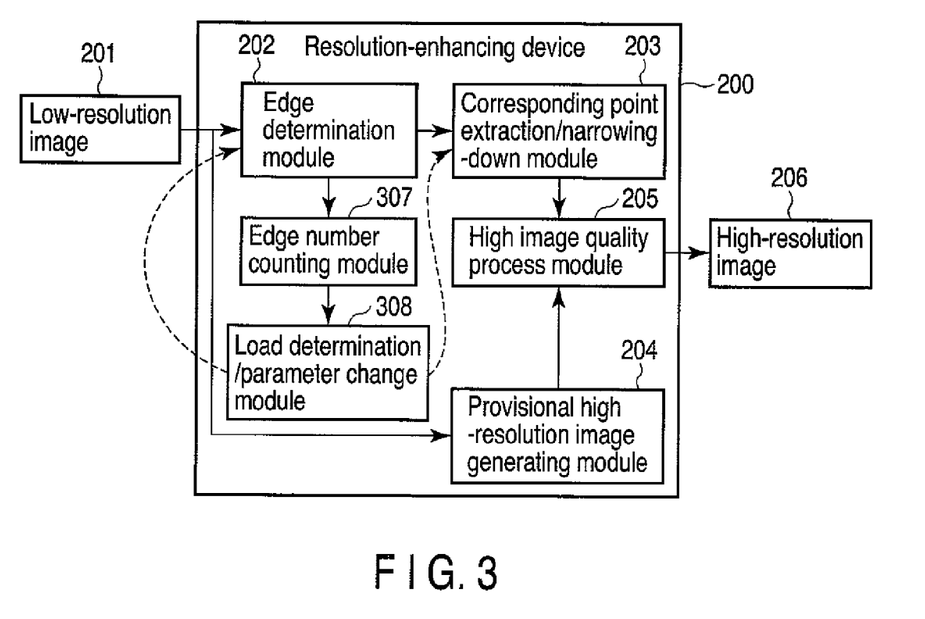
FIG. 3 is an exemplary block diagram showing a structure example of an improved resolution-enhancing device which is applied to the information processing apparatus according to the embodiment.

FIG. 3 shows the structure of an improved resolution-enhancing device 200.

This resolution-enhancing device 200 further includes an edge number counting module 307 and a load determination/parameter change module 308, in addition to the edge determination module 202, corresponding point extraction/narrowing-down module 203, provisional high-resolution image generating module 204 and high image quality process module 205, which have been described with reference to FIG. 2.

The edge number counting module 307 counts the number of edges which are detected by the edge determination module 202 from one frame that is the object of processing.

The load determination/parameter change module 308 calculates a maximum (threshold) edge number at which the computer can complete the resolution-enhancing process for one frame within a target process time (e.g. 33 msec). This maximum edge number is determined by the process capability of the computer, to be more specific, the capability of the video processor 29. In order to limit the detected number of edges to the maximum edge number or less, the load determination/parameter change module 308 changes the edge determination reference value on the basis of the detected edge number and the maximum edge number. For example, if the detected edge number exceeds the maximum edge number, the edge determination reference value is increased by the load determination/parameter change module 308. Thereby, the edge number that is detected decreases.

The load determination/parameter change module 308 also has a determination reference value changing function for changing a corresponding point determination reference value that is used in order for the corresponding point extraction/narrowing-down module 203 to determine valid corresponding points. This determination reference value changing function is a function of changing the corresponding point determination reference value so as to decrease the number of corresponding pixels corresponding to each edge, which are detected by the corresponding point extraction/narrowing-down module 203. This determination reference value changing function is executed during a time period in which the detected edge number exceeds the maximum edge number, for example, during a transitional response period. The transitional response period is a period from when the process of changing the edge determination reference value is started until the detected edge number actually decreases to the maximum edge number or less.

Further, the load determination/parameter change module 308 has a decimation (thinning-out) control function for causing the high image quality process module 205 to execute a process of thinning out the corresponding pixels that are to be subjected to the image quality enhancement process. This decimation (thinning-out) control function can also be executed during a time period in which the detected edge number exceeds the maximum edge number, for example, during a transitional response period.

Next, the control function of the load determination/parameter change module 308 is specifically described.

(Control of Edge Number)

The maximum process time, which is usable by the resolution-enhancing device 20 for the process of one frame, can be expressed by the following equation (1):

$$Tmax = Ec \times Tsearch\_squeze + Ec + Tsharpen \quad (1)$$

where Tmax: the maximum process time which is usable by the resolution-enhancing device for the process of one frame, Ec: the number of edges in the to-be-processed frame, Tsearch_squeze: the time needed for the corresponding point extraction/narrowing-down per edge, and Tsharpen: the time needed for the image quality enhancement process per pixel.

In the case of a video output with 30 frames/second, "Tmax" is 33 msec. Each value of "Tsearch_squeze" and "Tsharpen" is determined by the program execution speed of the computer. In other words, each value of "Tsearch_squeeze" and "Tsharpen" is a fixed value which is determined by the processing capability of the computer. Thus, from the equation (1), it is possible to calculate the maximum edge number which meets "Tmax", that is, the maximum edge number at which the computer can complete the resolution-enhancing process for one frame within a target process time. It is assumed that this maximum edge number is En.

The load determination/parameter change module 308 determines, with reference to the maximum edge number En, whether the computer can complete the resolution-enhancing process for one frame within a target process time. On the basis of this determination result, the load determination/parameter change module 308 changes the parameters, such as the edge determination reference value.

The edge determination module 202 uses the edge determination parameter "thEdge" as the above-described edge determination reference value. The edge determination reference value is a threshold value for the edge intensity (pixel value gradient). A pixel having a higher edge intensity than "thEdge" is determined as an edge. In the case where this edge determination parameter "thEdge" is assumed to be a large value, unless the edge intensity of a pixel of interest is higher than the edge determination parameter "thEdge", the pixel of interest is not determined as an edge. Accordingly, by increasing "thEdge", the number of edges, which are detected from each frame by the edge determination module 202, decreases.

The number of edges per frame, which are detected by the edge determination module 202, is counted by the edge number counting module 307. The edge number, which is counted by the edge number counting module 307, is the number of edges included in the frame that has been edge-determined by the edge determination module 202. Thus, the value of "thEdge", which is changed by the load determination/parameter change module 308, is not used for the edge detection of the current frame, but is used for the edge detection of the next frame.

The load determination/parameter change module 308 functions as a control module which adjusts the edge determination parameter "thEdge" on the basis of the edge number Ec, which is counted by the edge number counting module 307 on a frame-by-frame basis, and the maximum edge number En. The load determination/parameter change module 308 adjusts the edge determination parameter "thEdge" in the case of Ec>En. At this time, the load determination/parameter change module 308 executes control to increase the value of the edge determination parameter "thEdge", thereby decreasing the edge number Ec (the edge number in the next frame). On the other hand, in the case where the edge number Ec has decreased to the maximum edge number En or below, the load determination/parameter change module 308 restores (decreases) the "thEdge" to a proper value, thereby properly controlling the edge determination parameter thEdge and the edge number Ec.

Figure 5:
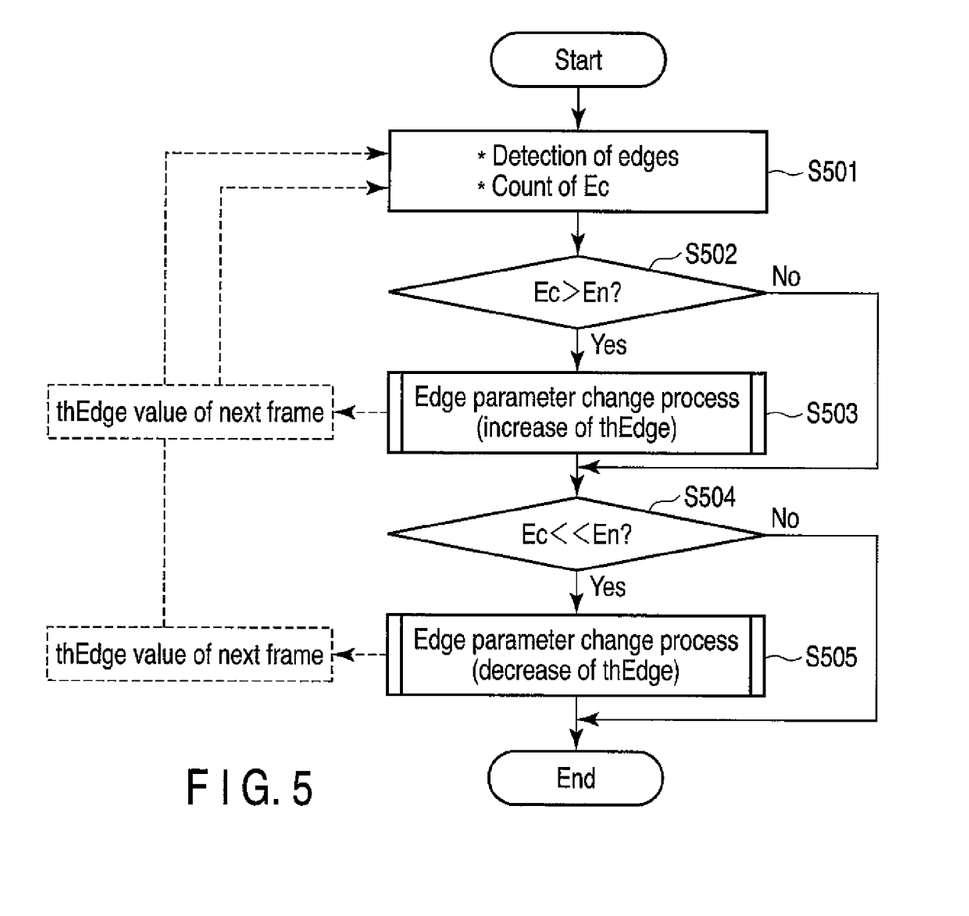
FIG. 5 is an exemplary flow chart illustrating an example of the procedure of an edge determination parameter adjusting process which is executed by the information processing apparatus according to the embodiment.

Next, referring to a flow chart of FIG. 5, a description is given of an thEdge adjustment process which is executed by the load determination/parameter change module 308.

In block S501, the detection of edges and the counting of the edge number Ec are executed by the edge determination module 202 and edge number counting module 307. The load determination/parameter change module 308 compares the edge number Ec and the maximum edge number En, thereby determining whether the edge number Ec is greater than the maximum edge number En (block S502).

In the case of Ec>En, that is, in the case where the edge number Ec is greater than the maximum edge number En (YES in block S502), the load determination/parameter change module 308 increases the value of the edge determination parameter "thEdge" so that the edge number Ec of the next frame may decrease (block S503). If the condition of Ec>En is not established (NO in block S502), the load determination/parameter change module 308 executes no operation.

Subsequently, the load determination/parameter change module 308 determines whether the edge number Ec is sufficiently below the maximum edge number En (Ec<<En) and the value of the current edge determination parameter "thEdge" is greater than the initial set value (block S504). If the condition of Ec<<En and the condition that the value of the current edge determination parameter "thEdge" is greater than the initial set value are satisfied (YES in block S504), the load determination/parameter change module 308 decreases the value of the edge determination parameter "thEdge" (block S505). In block S505, for example, the process of restoring the value of the edge determination parameter "thEdge" to the initial set value is executed.

The determination condition that is used in block S504 may be Ec≦En, instead of Ec<<En.

(Control of the Number of Corresponding Points)

Figure 6:
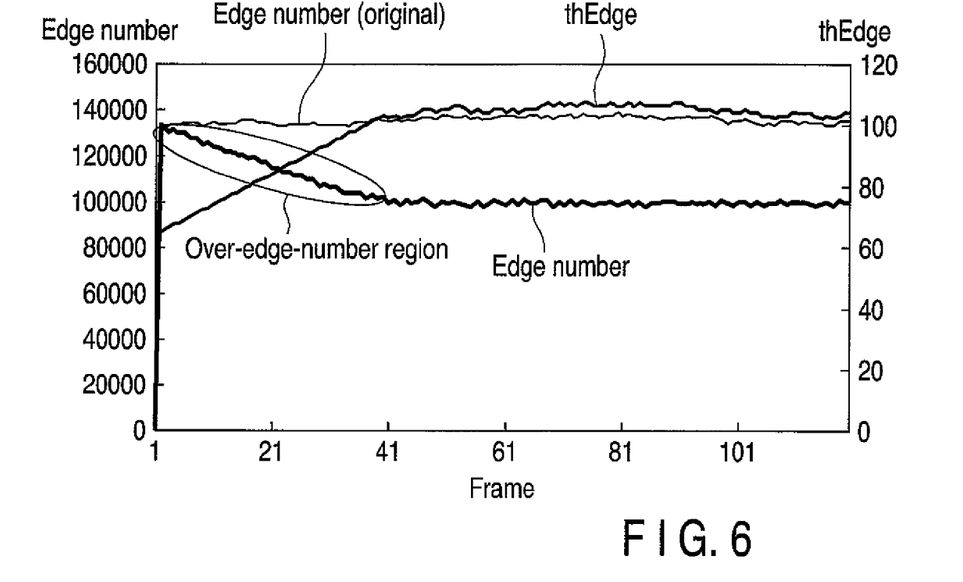
FIG. 6 is an exemplary graph showing the relationship between the value of an edge determination parameter and the detected edge number in the information processing apparatus according to the embodiment.

The edge number per frame and the process load can be controlled by the above-described control of the edge determination parameter "thEdge". However, even in the case where the value of the edge determination parameter "thEdge" is optimized, it is possible, for example, when a great increase in edge number has occurred from the previous frame, that the process of changing the edge determination parameter "thEdge" cannot follow the increase in the edge number, and the edge number Ec temporarily exceeds the maximum edge number En, as shown in FIG. 6. FIG. 6 shows, by way of example, the case in which the maximum edge number En is 100000. The period in which the edge number Ec is greater than the maximum edge number En is an over-edge-number period (transitional response period).

In order to complete the process for one frame within a target process time, a load-reducing mechanism at a time of Ec>En is needed. Thus, in the present embodiment, during the over-edge-number period until the edge number Ec decreases to the maximum edge number En or less, the load determination/parameter change module 308 executes a determination reference value changing process for changing the corresponding point determination reference value that is used in order for the corresponding point extraction/narrowing-down module 203 to determine valid corresponding points. As the corresponding point determination reference value, a validity threshold value "thValidity" is usable. The validity threshold value "thValidity" is a value which is used as a corresponding point determination reference in the narrowing-down process by the corresponding point extraction/narrowing-down module 203. Specifically, the corresponding point extraction/narrowing-down module 203 calculates the difference between the pixel value (luminance value) of the pixel including the edge in the low-resolution image 201 and the pixel value (luminance value) of each corresponding pixel in the provisional high-resolution image, which corresponds to this edge, and determines whether this difference falls within the range of the validity threshold value "thValidity". On the basis of this determination result, the corresponding point extraction/narrowing-down module 203 narrows down valid corresponding pixels from among the plural corresponding pixels which correspond to the edge, and determines the corresponding pixels which are to be actually applied to the high image quality process.

Accordingly, if the value of the validity threshold value "thValidity" is increased, the number of corresponding pixels, which are determined as valid corresponding pixels by the corresponding point extraction/narrowing-down module 203, increases. Conversely, if the value of the validity threshold value "thValidity" is decreased, the number of corresponding pixels, which are determined as valid corresponding pixels by the corresponding point extraction/narrowing-down module 203, decreases, and the high image quality process is executed on only the corresponding pixels having a smaller difference from the pixel value of the pixel including the edge.

The load determination/parameter change module 308 calculates an excess amount (=Ec−En) of the edge number Ec relative to the maximum edge number En, and adaptively controls the validity threshold value "thValidity" in accordance with the excess amount. In other words, the degree of variation of the validity threshold value "thValidity" as the determination reference value is adjusted in accordance with the excess amount.

Figure 7:
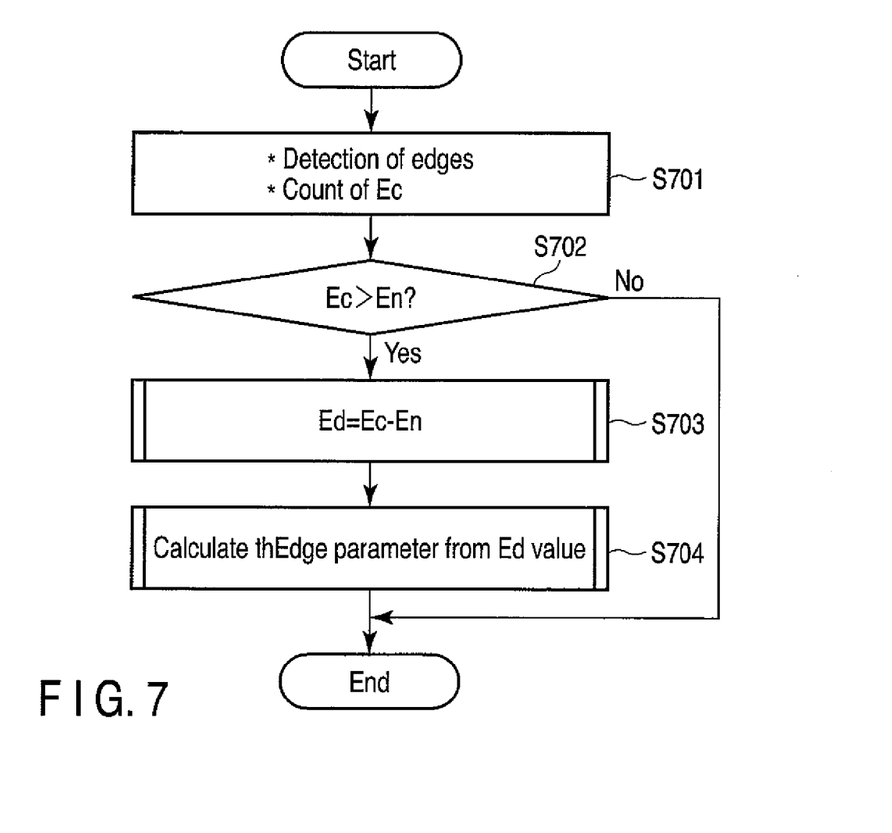
FIG. 7 is an exemplary flow chart illustrating an example of the procedure of a validity threshold value adjusting process which is executed by the information processing apparatus according to the embodiment.

Referring to a flow chart of FIG. 7, a description is given of the procedure of the validity threshold value adjustment process which is executed by the load determination/parameter change module 308.

In block S701, the detection of edges and the counting of the edge number Ec are executed by the edge determination module 202 and edge number counting module 307. The load determination/parameter change module 308 compares the edge number Ec and the maximum edge number En, thereby determining whether the edge number Ec is greater than the maximum edge number En (block S702).

In the case of Ec>En, that is, in the case where the edge number Ec is greater than the maximum edge number En (YES in block S702), the load determination/parameter change module 308 calculates a difference Ed (Ed=Ec−En) between the edge number Ec and the maximum edge number En (block S703). The load determination/parameter change module 308 calculates the validity threshold value "thValidity" on the basis of the difference Ed (block S704).

Examples of calculation of "thValidity" are shown below. The range of usable values as the "thValidity" value is 0 to 255. It is assumed that the initial value of the "thValidity" is 64.

(1) In the case of Ed>En: thValidity=0
(2) In the case of En>Ed>0: thValidity=8.

In the case of (1), the edge number Ec is double the maximum edge number En. In this case, the value of "thValidity" is changed to 0. In the case of (2), the edge number Ec is greater than the maximum edge number En and is less than double the maximum edge number En. In this case, the value of "thValidity" is changed to 8. The process illustrated in the flow chart of FIG. 7 can be executed in parallel with the process illustrated in the flow chart of FIG. 5.

(Decimation Control)

A description is given of a decimation (thinning-out) control function as another load-reducing mechanism which can be used during the transitional response period of Ec>En. The decimation (thinning-out) control function is a function of causing the high image quality process module 205 to execute a decimation process of thinning out corresponding pixels which are to be subjected to the image quality enhancement process.

Figure 8:
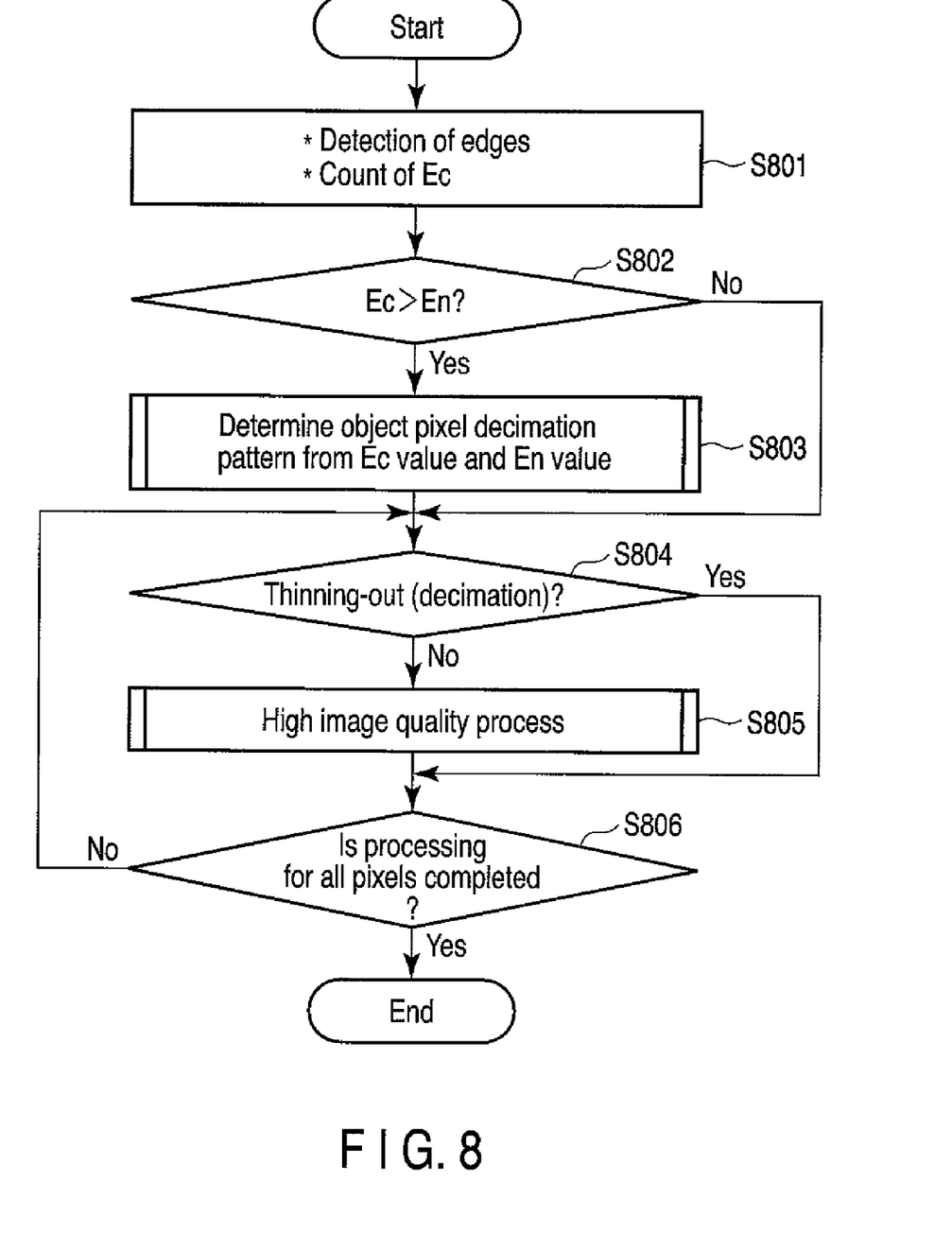
FIG. 8 is an exemplary flow chart illustrating an example of the procedure of a decimation control process which is executed by the information processing apparatus according to the embodiment.

Referring to a flow chart of FIG. 8, a description is given of the procedure of a decimation (thinning-out) control process which is executed by the load determination/parameter change module 308.

In block S801, the detection of edges and the counting of the edge number Ec are executed by the edge determination module 202 and edge number counting module 307. The load determination/parameter change module 308 compares the edge number Ec and the maximum edge number En, thereby determining whether the edge number Ec is greater than the maximum edge number En (block S802).

In the case of Ec>En, that is, in the case where the edge number Ec is greater than the maximum edge number En (YES in block S802), the load determination/parameter change module 308 determines a decimation (thinning-out) pattern which is to be applied to the object pixels of the image quality enhancement process, on the basis of the relationship between the edge number Ec and the maximum edge number En (block S803). The load determination/parameter change module 308 reports, as an instruction, this decimation (thinning-out) pattern to the high image quality process module 205, and causes the high image quality process module 205 to execute the process of thinning out object pixels (corresponding pixels) which are to be subjected to the image quality enhancement process.

The high image quality process module 205 determines, according to the decimation (thinning-out) pattern, whether each of the object pixels (corresponding pixels) is a pixel at a thinning-out position, on a pixel-by-pixel basis. The high image quality process module 205 skips the image quality enhancement process (high image quality process) for the pixel at the thinning-out position, and executes the image quality enhancement process (high image quality process) only for the pixel that is not at the thinning-out position (blocks S804 to S806).

Next, examples of the decimation (thinning-out) process are described.

(1) 1/2 Decimation

Figure 9:
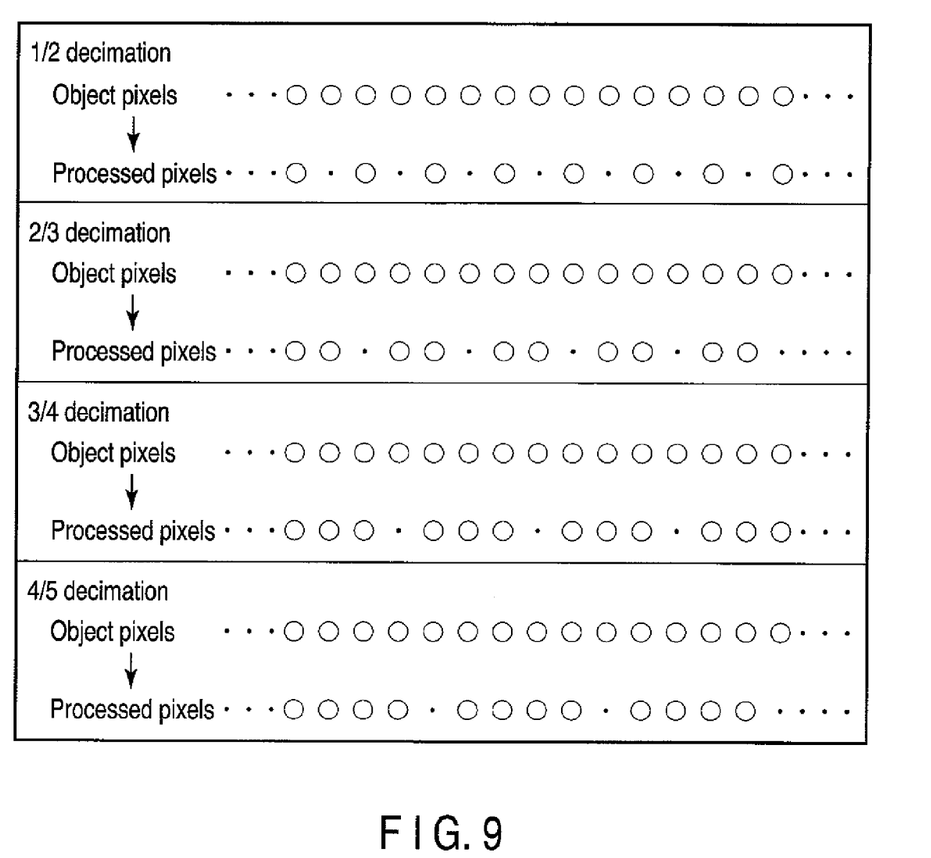
FIG. 9 shows examples of a decimation pattern which is used in the information processing apparatus according to the embodiment.

In the case of 2En>Ec>1.5En, "1/2 thinning-out" is applied. In this case, as shown in FIG. 9, every other object pixel is successively thinned out, and the image quality enhancement process (high image quality process) is executed at a ratio of one pixel to two pixels.

(2) 2/3 Decimation

In the case of 1.5En>Ec>1.333En, "2/3 thinning-out" is applied. In this case, as shown in FIG. 9, every third object pixel is successively thinned out, and the image quality enhancement process (high image quality process) is executed at a ratio of two pixels to three pixels.

(3) 3/4 Decimation

In the case of 1.333En>Ec>1.25En, "3/4 thinning-out" is applied. In this case, as shown in FIG. 9, every fourth object pixel is successively thinned out, and the image quality enhancement process (high image quality process) is executed at a ratio of three pixels to four pixels.

(4) 4/5 Decimation

In the case of 1.25En>Ec>1.2En, "4/5 thinning-out" is applied. In this case, as shown in FIG. 9, every fifth object pixel is successively thinned out, and the image quality enhancement process (high image quality process) is executed at a ratio of four pixels to five pixels.

(5) 5/6 Decimation

In the case of 1.2En>Ec>1.17En, "5/6 thinning-out" is applied. In this case, every sixth object pixel is successively thinned out, and the image quality enhancement process (high image quality process) is executed at a ratio of five pixels to six pixels.

(6) 6/7 Decimation

In the case of 1.17En>Ec>1.14En, "6/7 thinning-out" is applied. In this case, every seventh object pixel is successively thinned out, and the image quality enhancement process (high image quality process) is executed at a ratio of six pixels to seven pixels.

In this manner, the ratio of thinning out corresponding pixels, which are to be subjected to the image quality enhancement process, is adjusted in accordance with the excess amount of the detected edge number, relative to the maximum edge number.

Since it is not practical to execute the above-described case-by-case processes until reaching Ec=En, the 6/7 thinning-out may be fixedly executed in the case where Ec is 1.17 En or less. In addition, in the case where Ec is 2En or more, the 1/3 thinning-out or 1/4 thinning-out may be fixedly executed.

The process illustrated in the flow chart of FIG. 8 may be executed in parallel with the process illustrated in the flow chart of FIG. 5. Besides, the process illustrated in the flow chart of FIG. 5, the process illustrated in the flow chart of FIG. 7 and the process illustrated in the flow chart of FIG. 8 may be executed in parallel.

As has been described above, in the present embodiment, the processing load can be reduced even in the case of the moving picture signal which includes such a large number of edges that the time that is needed for the resolution-enhancing process exceeds a target process time. Thereby, the time that is needed for the resolution-enhancing process can be adjusted to a proper value. Therefore, the time, which is needed for the resolution-enhancing process per frame, can be made to fall within the predetermined target time, and it becomes possible to execute, e.g. a process of displaying a resolution-enhanced moving picture signal on a high-resolution display in real time, without causing problems such as frame dropping.

In the present embodiment, exemplification has been made of a computer as an information processing apparatus. However, the information processing apparatus is not limited to the computer, and it may be a digital TV, a set-top box, etc. The processes of the resolution-enhancing device can all be executed by a program. In this case, simply by installing this program in an ordinary computer through a computer-readable storage medium and executing the program, the same advantageous effects as in the present embodiment can easily be realized.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus configured to enhance a resolution in order to convert from a moving picture signal with a first resolution to a moving picture signal with a second resolution higher than the first resolution, the apparatus comprising:

an edge detection module configured to detect edges in a frame of the moving picture signal with the first resolution in accordance with a predetermined edge determination reference value;

an edge number counting module configured to count a number of edges detected;

a resolution convertor configured to convert a resolution of the frame from the first resolution to the second resolution, in order to generate a provisional high-resolution image of the second resolution;

a corresponding pixel point detection module configured to detect corresponding pixels in he provisional high-resolution image, which correspond to the detected edges;

an image quality enhancement module configured to sharpen the detected corresponding pixels in the provisional high-resolution image; and a controller configured to calculate a maximum edge number at which the information processing apparatus is able to complete the resolution enhancement for one frame within a target process time, and to vary the edge determination reference value based on the detected edge number and the maximum edge number, in order to suppress the detected edge number to the maximum edge number or smaller.

2. The information processing apparatus of claim 1, wherein the processing equipment is configured to vary a determination reference value used by the corresponding pixel point detection module in order to determine the corresponding pixels in such a manner that a number of the detected corresponding pixels is decreased, during a time period while the detected edge number exceeds the maximum edge number.

3. The information processing apparatus of claim 2, wherein the processing equipment is configured to adjust a degree of varying the determination reference value in accordance with an excess amount of the detected edge number relative to the maximum edge number.

4. The information processing apparatus of claim 1, wherein the processing equipment is configured to cause the image quality enhancement module to thin out the corresponding pixels which are to be sharpened during a time period while the detected edge number exceeds the maximum edge number.

5. The information processing apparatus of claim 4, wherein the processing equipment is configured to adjust a ratio of thinning out the corresponding pixels which are to be sharpened in accordance with an excess amount of the detected edge number relative to the maximum edge number.

6. An image processing method of enhancing a resolution in order to convert from a moving picture signal with a first resolution to a moving picture signal with a second resolution higher than the first resolution by an information processing apparatus, comprising:
  detecting edges in a frame of the moving picture signal with the first resolution in accordance with a predetermined edge determination reference value;
  counting a number of edges detected;
  converting a resolution of the frame from the first resolution to the second resolution in order to generate a provisional high-resolution image comprising the second resolution;
  detecting corresponding pixels in the provisional high-resolution image which correspond to the detected edges; and
  sharpening the detected corresponding pixels in the provisional high-resolution image; and
  calculating a maximum edge number at which the information processing apparatus is able to complete the resolution enhancement process for one frame within a target process time, and varying the edge determination reference value based on the detected edge number and the maximum edge number, in order to suppress the detected edge number to the maximum edge number or smaller.

7. The image processing method of claim 6, further comprising varying a determination reference value used in order to determine the corresponding pixels, in such a manner that a number of the detected corresponding pixels is decreased during a time period while the detected edge number exceeds the maximum edge number.

8. The image processing method of claim 7, wherein the varying the determination reference value comprises adjusting a degree of varying the determination reference value in accordance with an excess amount of the detected edge number relative to the maximum edge number.

9. The image processing method of claim 6, further comprising thinning out the corresponding pixels which are to be sharpened during a time period while the detected edge number exceeds the maximum edge number.

10. The image processing method of claim 9, wherein the thinning out of the corresponding pixels comprises adjusting a ratio of thinning out the corresponding pixels which are to be sharpened in accordance with an excess amount of the detected edge number relative to the maximum edge number.

* * * * *